United States Patent
Iwatsuki et al.

(10) Patent No.: US 7,300,380 B2
(45) Date of Patent: Nov. 27, 2007

(54) COOPERATIVE CONTROL SYSTEM FOR PRIME MOVER AND CONTINUOUSLY VARIABLE TRANSMISSION OF VEHICLE

(75) Inventors: Kunihiro Iwatsuki, Nagoya (JP); Yasuhiro Oshiumi, Gotenba (JP); Takayuki Amaya, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 190 days.

(21) Appl. No.: 10/557,418

(22) PCT Filed: May 18, 2004

(86) PCT No.: PCT/JP2004/007059

§ 371 (c)(1),
(2), (4) Date: Nov. 18, 2005

(87) PCT Pub. No.: WO2004/102041
PCT Pub. Date: Nov. 25, 2004

(65) Prior Publication Data
US 2006/0234828 A1   Oct. 19, 2006

(30) Foreign Application Priority Data
May 19, 2003   (JP) .............................. 2003-140689

(51) Int. Cl.
*F16H 61/00* (2006.01)
(52) U.S. Cl. ..................................................... 477/45
(58) Field of Classification Search .................. 477/45, 477/48
See application file for complete search history.

(56) References Cited

U.S. PATENT DOCUMENTS 7,189,184 B2 * 3/2007 Oshiumi et al. .............. 477/46

| | | |
|---|---|---|
| 2001/0023216 A1 | 9/2001 | Bolz et al. |
| 2002/0004437 A1 | 1/2002 | Asayama et al. |
| 2004/0242370 A1 | 12/2004 | Iwatsuki et al. |
| 2005/0181909 A1 * | 8/2005 | Oshiumi et al. ............ 477/156 |

FOREIGN PATENT DOCUMENTS

| | | |
|---|---|---|
| JP | 6-11022 | 1/1994 |
| JP | 9-500707 | 1/1997 |
| JP | 2000 511849 | 9/2000 |
| JP | 2001-12593 | 1/2001 |
| JP | 2001 518171 | 10/2001 |
| JP | 2001-330099 | 11/2001 |
| JP | 2003 042276 | 2/2003 |
| JP | 2003-65428 | 3/2003 |

OTHER PUBLICATIONS

7th Luk Symposium, "Gearing up for tomorrow, Take a Luk inside . . .", pp. 80-87 Apr. 11/12, 2002.

Primary Examiner—Dirk Wright
(74) Attorney, Agent, or Firm—Oblon, Spivak, McClelland, Maier & Neustadt, P.C.

* cited by examiner

(57) ABSTRACT

A cooperative control system for a prime mover and a continuously variable transmission of a vehicle, in which the continuously variable transmission is connected to an output side of the prime mover for generating a driving force for running, and in which a clamping pressure to set a torque capacity of the continuously variable transmission is raised and an input torque to the continuously variable transmission is lowered on the basis of a decision of the slip in the continuously variable transmission. A clamping pressure/input torque sequential control raises an actual pressure of the clamping pressure at or after a deciding instant of the slip convergence, and executes a control to complete a restoration of an actual torque of the lowered input torque afterward.

19 Claims, 4 Drawing Sheets

FIG.3
(a)
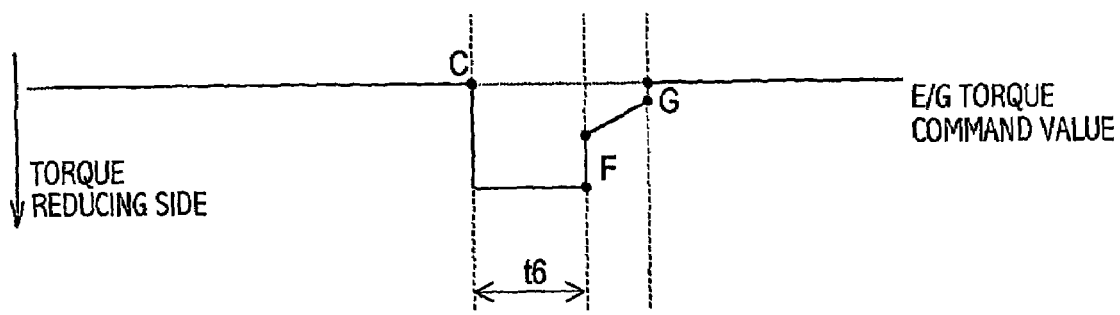
(b)
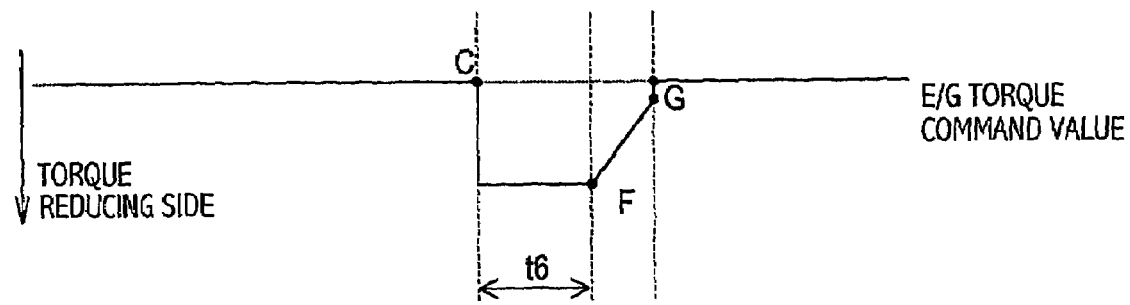

COOPERATIVE CONTROL SYSTEM FOR PRIME MOVER AND CONTINUOUSLY VARIABLE TRANSMISSION OF VEHICLE

TECHNICAL FIELD

This invention relates to a control system for a vehicle in which a continuously variable transmission is connected to an output side of a prime mover such as an internal combustion engine, and more particularly, to a system for controlling the prime mover cooperatively with a behavior of the continuously variable transmission.

BACKGROUND ART

A drive torque of a vehicle such as an automobile is generated by a prime mover such as an engine and transmitted through a gearing mechanism such as a clutch and a transmission to wheels. The torque to be inputted from the prime mover can be transmitted to the output side such as driving wheels, if a transmission torque capacity of the gearing mechanism is sufficiently large. However, if the transmission torque capacity is too large more than necessary, a power to be consumed for that purpose is also increased, so that the mileage of the vehicle as a whole is deteriorated. Generally in the prior art, therefore, an oil pressure for setting the transmission torque capacity of the gearing mechanism is set so as to correspond to an output of the prime mover in advance. Otherwise, the control system is constructed to reflect the output of the prime mover on a regulation level of the oil pressure.

Especially, in a continuously variable transmission for a vehicle, if a clamping pressure for clumping a belt, a power roller and so on is raised, the transmission torque capacity is increased, and on the contrary, the transmission efficiency of the power is degraded in the continuously variable transmission. On the other hand, it is necessary to certainly prevent the damage such as a wear caused by a slip, therefore, a high precision is required for the control of the clamping pressure. However, it is not necessarily the case that a running state or a driving state of the vehicle is always constant. Therefore, a high torque acts temporarily on the gearing mechanism such as the continuously variable transmission, and as a result, the slip may occur. Also, there is a case of causing a slight slip intentionally, with the purpose of determining a slip limit pressure for causing the slip.

In the prior art, JP-A-6-11022 discloses a system for detecting the slip on the basis of a comparison result between a theoretical changing rate of the gear change and an actual changing rate of the gear change when the slip occurs in a belt type continuously variable transmission as an example of the gearing mechanism. The system disclosed in JP-A-6-11022 is constructed to suppress the slip in the belt type continuously variable transmission by raising the clamping pressure with increasing a line pressure, and by lowering the output of the engine with closing a throttle opening, delaying an ignition timing, or reducing a feeding amount of a fuel.

As disclosed in the aforementioned JP-A-6-11022, if the clamping pressure is raised to suppress or converge the slip in case the slip is detected in the belt type continuously variable transmission, the torque limited by the slip of the belt to act on the continuously variable transmission is raised. As a result of this, an output shaft torque is varied. Moreover, the torque acting on the continuously variable transmission is lowered when the output of the engine or an electric motor of the input side of the continuously variable transmission, so that the slip can be suppressed or converged. However, if the output of the engine or the electric motor is lowered as the vehicle is running and such a lowering state continues even after said convergence of the slip, a driving torque of the driving wheel is also lowered. Thus, when the output shaft torque or the driving torque varies, an accompanying shock occurs and an uncomfortable feeling may be felt.

DISCLOSURE OF THE INVENTION

An object of this invention is to provide a system capable of preventing shocks and an uncomfortable feeling caused by a change in an output of a prime mover corresponding to a slip or the like of a continuously variable transmission.

In order to achieve the above-specified objects, according to the invention, there is provided a cooperative control system for a prime mover and a continuously variable transmission of a vehicle, in which the continuously variable transmission is connected to an output side of the prime mover for generating a driving force for running, and in which a clamping pressure for setting a torque capacity of the continuously variable transmission is raised and an input torque to said continuously variable transmission is lowered on the basis of a decision of the slip in the continuously variable transmission, characterized by comprising: clamping pressure/input torque sequential control means for raising an actual pressure of said clamping pressure at or after a deciding instant of said slip convergence, and for executing a control to complete a restoration of an actual torque of said lowered input torque after that.

According to the control system of the invention, therefore, a raising command timing of the clamping pressure and a raising command timing of the lowered input torque are adjusted properly so as to start raising the actual clamping pressure at or after the instant of a slip convergence in the continuously variable transmission, and to complete the restoration of the lowered actual input torque after that. As a result, a resumption of the slip in the continuously variable transmission and the uncomfortable feeling due to widening of the fluctuation of the output shaft torque can be prevented or suppressed.

Moreover, the control system according to the invention may further comprise clamping pressure raising command means for setting the raising command timing of said clamping pressure on the basis of an action state of said prime mover or said continuously variable transmission.

According to the control system of the invention, therefore, the raising command timing of the clamping pressure is adjusted properly on the basis of, e.g., the action state of the prime mover such as a revolution speed at that instant. Specifically, the raising command timing of the clamping pressure is set so as to start raising the actual clamping pressure at or after the instant of the slip convergence in the continuously variable transmission, and to complete the restoration of the lowered actual input torque after that. As a result, the resumption of the slip in the continuously variable transmission and the uncomfortable feeling due to the fluctuation of the output shaft torque can be prevented or suppressed.

Moreover, the control system according to the invention may further comprise input torque gradually increasing means for completing the restoration of the actual torque of said lowered input torque by increasing gradually.

According to the control system of the invention, therefore, an amount of the input torque lowering command is controlled to be reduced gradually so as to complete the restoration, in case the slip converges in the continuously variable transmission and the lowered actual input torque is thereby to be restored. As a result, the shocks as might otherwise be caused when the lowered actual input torque completes the restoration is suppressed, and the uncomfortable feeling or the like due to the fluctuation of the output shaft torque can be prevented or suppressed.

Still moreover, the control system according to the invention may further comprise clamping pressure/input torque learning means for learning and correcting the raising command timing of said clamping pressure with respect to the lowering command timing of said input torque, on the basis of a convergence timing of said slip and a start timing of a rise in the actual clamping pressure.

According to the control system of the invention, therefore, the raising command timing of said clamping pressure and the lowering command timing of said input torque are learned and corrected on the basis of the comparison result between the convergence timing of the slip and the start timing of the rise in the actual clamping pressure. Specifically, the raising command timing of the clamping pressure and the lowering command timing of the input torque are set so as to start raising the actual clamping pressure at or after the instant of the slip convergence in the continuously variable transmission, and to complete the restoration of the lowered actual input torque after that. As a result, the resumption of the slip in the continuously variable transmission and the uncomfortable feeling due to the fluctuation of the output shaft torque can be prevented or suppressed.

Furthermore, the control system according to the invention may comprise input torque lowering command means for setting an amount of the input torque lowering command on the basis of a convergence period from the start of reduction until the convergence of said slip, or on the basis of the convergence gradient.

According to the control system of the invention, therefore, the amount of the lowering command of the input torque is properly set on the basis of the convergence period from the instant at which the slip starts reducing in the continuously variable transmission until the instant at which the slip converges, or on the basis of the convergence gradient during that period. Specifically, the amount of the input torque lowering command is set to start raising the actual clamping pressure after the instant of the slip convergence in the continuously variable transmission, and to complete the restoration of the lowered actual input torque after that. As a result, the resumption of the slip in the continuously variable transmission and the uncomfortable feeling due to the fluctuation of the output shaft torque can be prevented or suppressed.

BRIEF DESCRIPTION OF THE DRAWINGS

FIG. 3 is a diagram showing another example of the time chart of the case in which a control shown in FIG. 1 is executed.

BEST MODE FOR CARRYING OUT THE INVENTION

Figure 4:
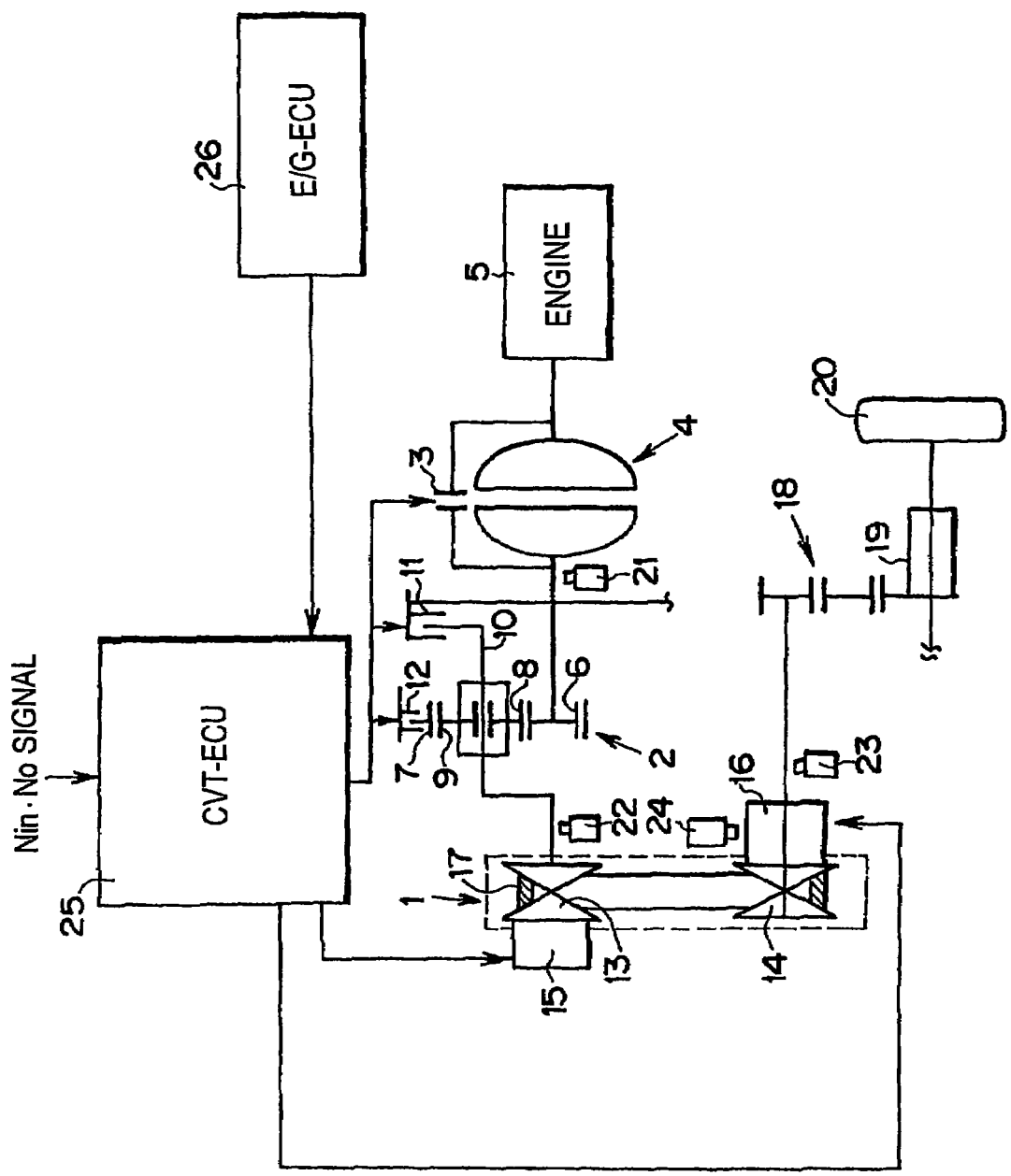
FIG. 4 is a diagram showing one example of a transmission line including a gearing mechanism to which the invention is applied.

Next, this invention will be described on the basis of its specific examples. First of all, here will be described one example of a drive line including a prime mover and a continuously variable transmission, to which the invention is applied. FIG. 4 shows a drive line including a belt type continuously variable transmission 1 schematically. This continuously variable transmission 1 is connected to a prime mover 5 through a forward/backward switching mechanism 2 and through a fluid transmission mechanism 4 having a lockup clutch 3.

The prime mover 5 is constructed of an internal combustion engine; an internal combustion engine and an electric motor; or an electric motor. In the following description, the prime mover 5 will be called the "engine 5". On the other hand, the fluid transmission mechanism 4 has a construction similar to that of the torque converter of the background art. Specifically, the fluid transmission mechanism 4 is constructed to include: a pump impeller to be rotated by the engine 5; a turbine runner arranged to confront the pump impeller; and a stator interposed between them, so that the turbine runner may be rotated to transmit the torque by feeding it with a spiral flow of a fluid generated by the pump impeller.

In torque transmission through the fluid, an inevitable slip occurs between the pump impeller and the turbine runner to cause a drop in the power transmission efficiency. In order to avoid such factor, there is provided the lockup clutch 3 for directly connecting an input side member such as the pump impeller and an output side member such as the turbine runner. This lockup clutch 3 is constructed to be controlled by an oil pressure into a completely applied state, a completely released state and a slip state or their intermediate state, and is enabled to control the slip speed properly.

The forward/backward switching mechanism 2 is adopted as the rotating direction of the engine 5 is limited to one direction, and is constructed to output the input torque either as it is or in a reversed direction. In the example shown in FIG. 4, a double pinion type planetary gear mechanism is adopted as the forward/backward switching mechanism 2. Specifically, there are arranged a ring gear 7 concentrically with a sun gear 6. Between these sun gear 6 and ring gear 7, there are arranged a pinion gear 8 meshing with the sun gear 6 and another pinion gear 9 meshing with both that pinion gear 8 and the ring gear 7. Those pinion gears 8 and 9 are so held by a carrier 10 as to rotate thereon and to revolve around the carrier 10. The forward/backward switching mechanism 2 is further provided with: a forward clutch 11 for connecting two rotary elements (e.g., the sun gear 6 and the carrier 10) integrally; and a backward brake 12 for reversing the direction of the output torque by fixing the ring gear 7 selectively.

The continuously variable transmission 1 has the same construction as that of a belt type continuously variable transmission known in the background art. The continuously variable transmission 1 is constructed such that each of a drive pulley 13 and a driven pulley 14 arranged in parallel is composed of a stationary sheave and a movable sheave to be moved back and forth in the axial directions by hydraulic actuators 15 and 16. Therefore, the groove widths of the individual pulleys 13 and 14 are varied as the movable sheaves are axially moved, so that the running radii of a belt 17 (or the effective diameters of the pulleys 13 and 14) made to run on the individual pulleys 13 and 14 continuously vary, so as to change the gear ratio continuously. The drive pulley 13 is connected to the carrier 10 acting as the output element in the forward/backward switching mechanism 2.

Here, the hydraulic actuator 16 in the driven pulley 14 is fed through the not-shown oil pump and hydraulic control device with an oil pressure (e.g., a line pressure or its compensating pressure) according to the torque to be inputted to the continuously variable transmission 1. When the individual sheaves in the driven pulley 14 clamp the belt 17, therefore, the belt 17 is tensed to retain the clamping pressure (or the contact pressure) between the individual pulleys 13 and 14 and the belt 17. On the contrary, the hydraulic actuator 15 in the drive pulley 13 is fed with a pressure oil according to the gear ratio to be set, thereby to set a groove width (or an effective diameter) according to the target gear ratio.

The aforementioned driven pulley 14 is connected through a gear unit 18 to a differential 19, so that the torque is outputted from the differential 19 to drive wheels 20. In the drive mechanism thus far described, therefore, the lockup clutch 3 and the continuously variable transmission 1 are arrayed in tandem between the engine 5 and the drive wheels 20.

There are provided a variety of sensors for detecting the action state (or the running state) of a vehicle carrying the continuously variable transmission 1 and the engine 5 thus far described. Specifically, the sensors are: a turbine speed sensor 21 for detecting the input speed (i.e., the speed of the aforementioned turbine runner) to the continuously variable transmission 1 to output a signal; an input speed sensor 22 for detecting the speed of the drive pulley 13 to output a signal; an output speed sensor 23 for detecting the speed of the driven pulley 14 to output a signal; and an oil pressure sensor 24 for detecting the pressure of the hydraulic actuator 16, which is disposed on the side of the driven pulley 14 so as to set the belt clamping pressure. Although not shown especially, there are also provided: an accelerator opening sensor for detecting the depression of an accelerator pedal to output a signal; a throttle opening sensor for detecting the opening of the throttle valve to output a signal; and a brake sensor for outputting a signal when a brake pedal is depressed.

There is further provided a transmission electronic control unit (CVT-ECU) 25 for performing the controls to apply/release the aforementioned forward clutch 11 and backward brake 12, the control of the clamping pressure of the aforementioned belt 17, the control of the gear ratio, and the control of the lockup clutch 3. This electronic control unit 25 is constructed mainly of a microcomputer, for example, to perform operations according to preset programs on the basis of the data inputted and the data stored in advance, thereby to execute: the setting of various states such as forward, reverse or neutral and the clamping pressure demanded; the setting of the gear ratio; the application/release of the lockup clutch 3; and the control of the slip speed or the like.

Here are enumerated examples of data (or signals) to be inputted to the transmission electronic control unit (CVT-ECU) 25. The signal of an input speed (e.g., an input number of revolutions per minute) Nin of the continuously variable transmission 1, and the signal of an output speed (e.g., an output number of revolutions per minute) No of the continuously variable transmission 1 are inputted from the respectively corresponding sensors. From an engine electronic control unit (E/G-ECU) 26 for controlling the engine 5, there are also inputted the signal of an engine speed Ne, the signal of an engine (E/G) load, the throttle opening signal, the accelerator opening signal indicating the depression of the (not-shown) accelerator pedal, and so on.

The continuously variable transmission 1 can control the engine speed or the input speed steplessly (or continuously) thereby to improve the mileage of the vehicle having this transmission mounted thereon. For example: a target drive force is determined on the basis of a demanded drive expressed by the accelerator opening and a vehicle speed; a target output necessary for achieving the target drive force is determined on the basis of the target drive force and a vehicle speed; an engine speed for achieving the target output with an optimum mileage is determined on the basis of a prepared map; and the gear ratio is controlled to establish the engine speed.

The power transmission efficiency in the continuously variable transmission 1 is so controlled in a satisfactory state that the advantage of the mileage improvement may not be deteriorated. Specifically, the torque capacity, i.e., the belt clamping pressure of the continuously variable transmission 1 is controlled to a level so low as possible as to transmit the target torque, determined on the basis of the engine torque and as to cause no slip of the belt 17. For example, under the so-called "unsteady" running state, in which an acceleration/deceleration is made comparatively frequently, or in which a road has roughness or inequalities, the belt clamping pressure is set by the line pressure as an initial pressure of the entire hydraulic line to control the continuously variable transmission 1, or by its compensating pressure. Under the steady running state, in which the vehicle cruises faster than a certain velocity, or under the quasi-steady running state, on the contrary, the belt clamping pressure is set by adding the pressure for setting a margin transmission torque for the preset safety factor or the slip to a minimum pressure (as will be called the "slip limit pressure" hereinafter) capable of transmitting the input torque without causing any slip.

In case the belt clamping pressure is lowered because of the steady running state or the quasi-steady running state, as described above, the pressure applied to the slip limit pressure, in other words, the margin for the slip is small. Therefore, the slip is liable to occur when the input torque from the engine 5 side is raised. The slip of the continuously variable transmission 1, which is caused by the increase of the input torque, can be converged by lowering the input torque. However, in order to suppress or prevent the depression of the driving torque of the vehicle as a whole, as accompanying the decrease of the input torque to the continuously variable transmission 1, the cooperative control system of this invention is constructed to execute the controls as will be described in the following.

Figure 1:
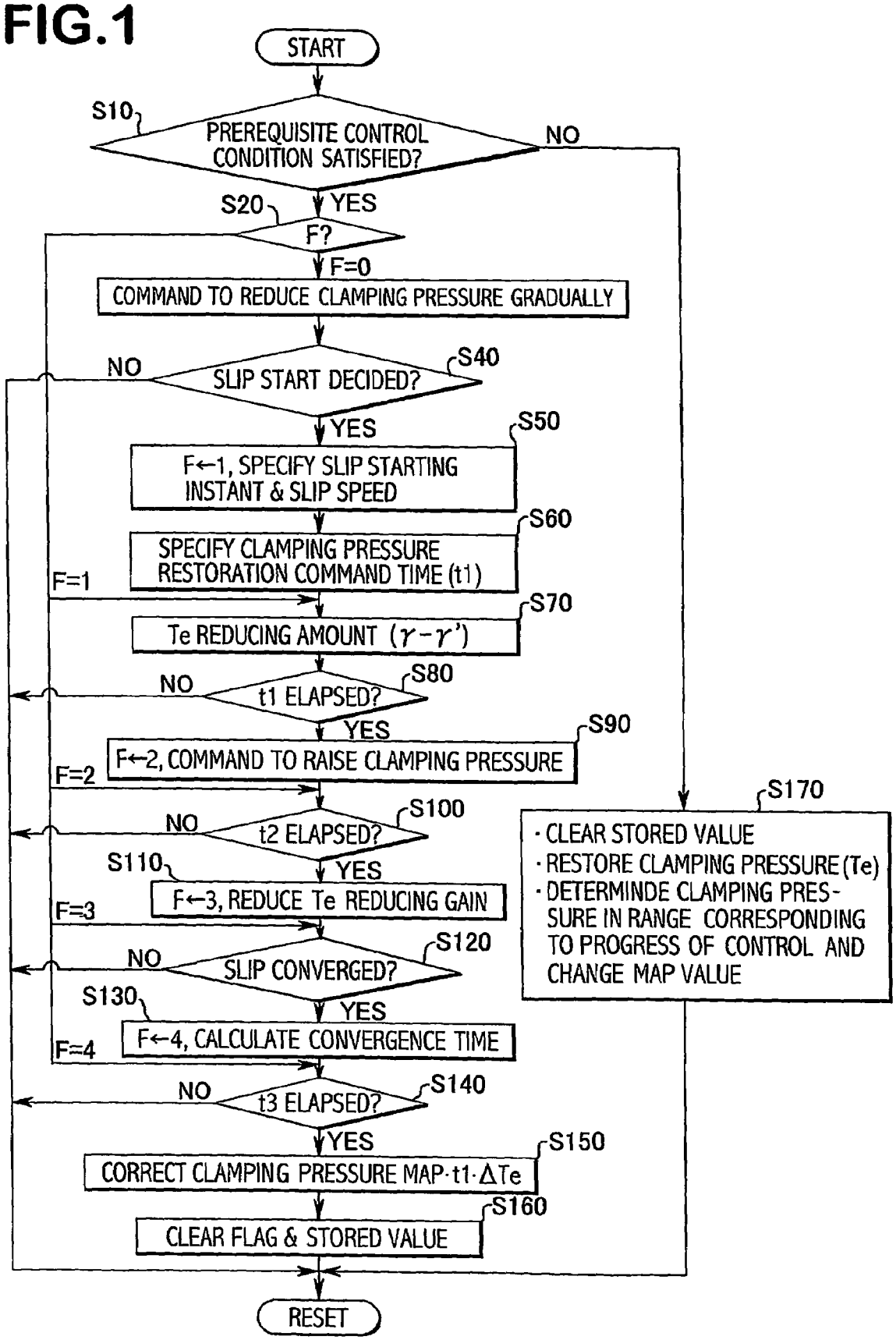
FIG. 1 is a flow chart for explaining a control example according to a control system of this invention.
Figure 2:
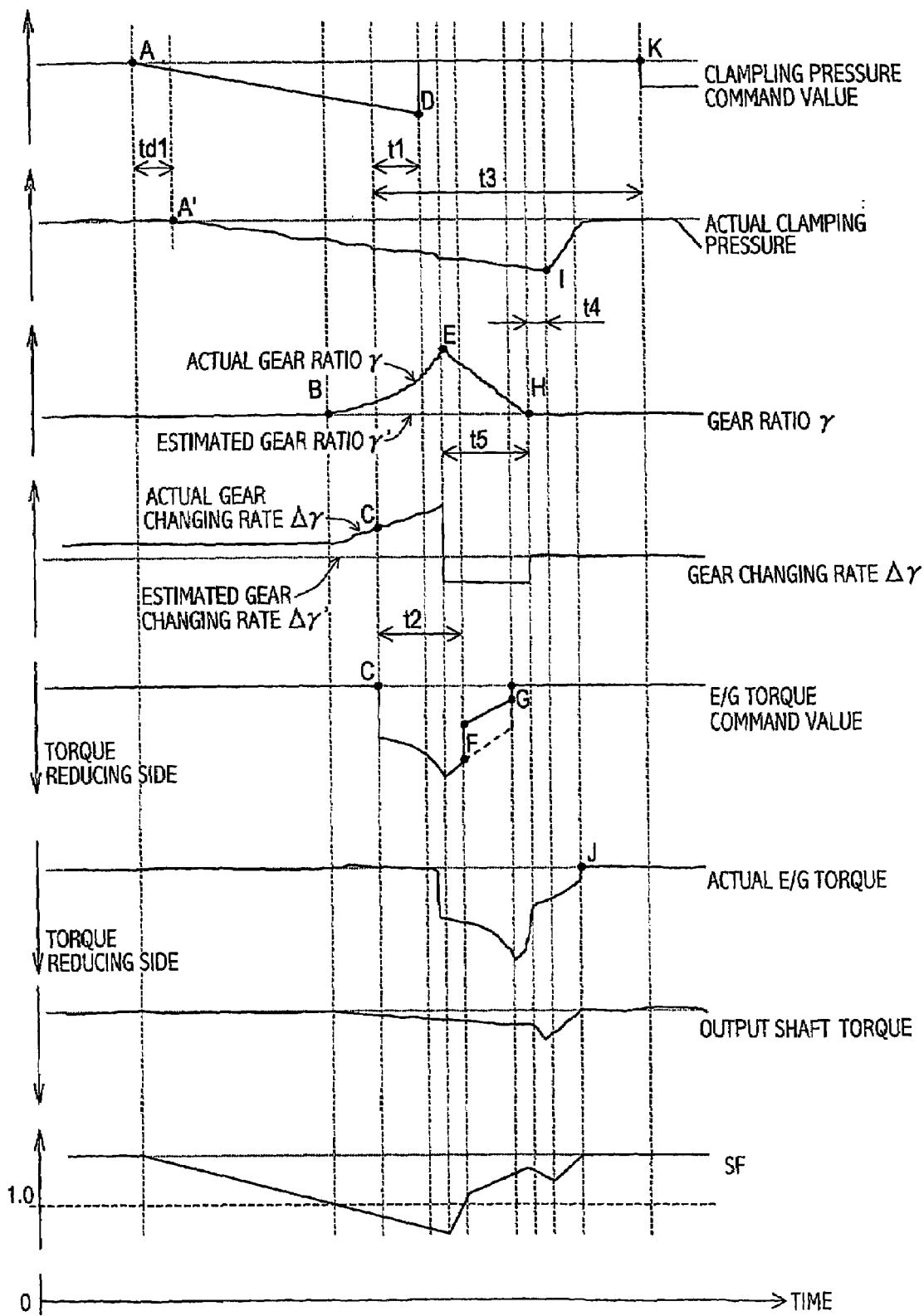
FIG. 2 is a diagram showing one example of a time chart of the case in which a control shown in FIG. 1 is executed.

FIG. 1 is a flowchart for explaining a control example according to a control system of this invention, and FIGS. 2 and 3 are time charts of the case in which a control shown in FIG. 1 is made, showing a change in the clamping pressure, the gear ratio and so on.

In FIG. 1, it is decided (at Step S10) whether or not the prerequisite control condition is satisfied. This prerequisite control condition is exemplified by: that the vehicle is in the steady running state or in the quasi-steady running state; that the belt clamping pressure is not completely corrected; that the control device does not fail; and so on.

In case the prerequisite control condition is not satisfied so that the answer of Step S10 is NO, the routine advances to Step S170. At this Step, the stored value is cleared, the lowered clamping pressure is restored and the clamping pressure map value in the range corresponding to the progressing situation is changed. This is a control to set the clamping pressure by lowering the clamping pressure to the level which is the sum of the clamping pressure level at the instant of dissatisfaction of the prerequisite control condition and the clamping pressure corresponding to the road surface input, in case the prerequisite control condition is dissatisfied prior to detecting the belt slip when the clamping pressure is lowered to detect the belt slip of the continuously variable transmission 1. After this, the routine is once ended.

In case the prerequisite control condition is satisfied so that the answer of Step S10 is YES, a flag F is decided (at Step S20). This flag F is: set at "1" in case the occurrence of the belt slip in the continuously variable transmission 1 is decided; set at "2" when the clamping pressure is increased after the decision of occurrence of the slip; set at "3" when a torque reducing amount of the engine in reduced; and set at "4" when the convergence of the belt slip is decided after that. In addition, the flag F is set to "0" in the beginning of the control. Accordingly, the decision of "F=0" holds at Step S20 in the beginning of the routine in FIG. 1, and the routine advances to the next Step S30 to output a clamping pressure gradually decreasing command to lower the clamping pressure gradually, so as to detect the belt slip in the continuously variable transmission 1.

When the clamping pressure gradually decreasing command is outputted, the slip of the belt 17 in the continuously variable transmission 1 is decided (Step S40). The belt slip can be decided on the basis of, e.g., a compared value between an actual gear changing rate $\Delta\gamma$ and an estimated gear changing rate $\Delta\gamma'$ of the case assuming that the belt slip at the present instant estimated from the gear changing rate at the preset time before the present instant does not occur; and In case the slip in the continuously variable transmission 1 is not decided so that the answer of Step S40 is NO, this routine is once ended without performing the subsequent controls. In case the slip occurs in the continuously variable transmission 1 so that the answer of Step S40 is YES, on the contrary, the routine advances to Step S50. At this Step, the flag F is set at "1", and a belt slip starting instant and a slip extent are detected. This slip extent can be determined on the basis of, e.g., the comparison value between an estimated gear ratio $\gamma'$ of the case assuming that the belt slip at the present instant estimated from the gear changing tendency of the gear ratio $\gamma$ at the preset time before the present instant does not occur; and an actual gear ratio $\gamma$.

In case the belt slip occurs in the continuously variable transmission 1, so-called a "stick slip phenomenon" may occur, in which the belt 17 slightly slips repeatedly, and the gear ratio $\gamma$ fluctuates with repeating vibratory change large and small. Therefore, the belt slip may be detected easier in terms of the gear changing rate $\Delta\gamma$ rather than the gear ratio $\gamma$. Accordingly, the belt slip can be detected immediately by carrying out the decision of the slip and the detection of the slip extent separately.

At the same time, a clamping pressure restoration command time t1 as a time for outputting a clamping pressure raising command to restore the lowered clamping pressure is determined (at Step S60) on the basis of the action state of the drive line at the instant of occurrence of the belt slip. The action state of the drive line is the state of, e.g., the engine speed, the engine torque, a cooling water temperature of the engine 5, the gear ratio $\gamma$ of the continuously variable transmission 1, a working oil temperature of the hydraulic line and so on. The torque reducing amount of the engine is set on the basis of the deviation $(\gamma-\gamma')$ between the estimated gear ratio $\gamma$ estimated from the gear ratio when the belt slip does not occur and the actual gear ratio $\gamma$, and the command value to reduce the engine torque is outputted (at Step S70).

When the command to reduce the engine torque is outputted at Step S70, the belt slip is decided, and it is decided (at Step S80) whether or not the clamping pressure restoration command time t1 set at aforementioned step S60 has elapsed from the instant at which the command to reduce the engine torque is outputted. In case the clamping pressure restoration command time t1 has not elapsed so that the answer of Step S80 is NO, this routine is once ended without performing the subsequent controls. In case the clamping pressure restoration command time t1 has elapsed so that the answer of Step S80 is YES, on the contrary, this routine advances to Step S90. At this Step S90, the flag is set at "2" and the clamping pressure increasing command to restore the lowered clamping pressure is outputted.

Here, in case the engine speed is low, for example, an explosion period i.e., an ignition period of the engine 5 becomes longer. This may delay a substantial start of the reduction of the engine torque in response to the command to reduce the engine torque, on which ignition timing is reflected, and, the convergence of the belt slip may be delayed. At this time, if the clamping pressure lowered before the convergence of the belt slip starts increasing, the continuously variable transmission 1 is brought into an abrupt upshift state so that the output shaft torque may largely fluctuate. Therefore, the clamping pressure restoration command time t1 is adjusted and properly set in accordance with the convergence timing of the belt slip, by controlling to increase the clamping pressure restoration command time t1 for the lower engine speed, as Steps S60 to S90 described above. As a result, the shocks caused by the fluctuation of the output shaft torque can be prevented or suppressed.

When the increasing command of the clamping pressure is outputted at Step S90, it is decided (at Step S100) whether or not a preset time t2 has elapsed from the instant at which the belt slip is decided and the command to reduce the engine torque is outputted. In case the preset time t2 has not elapsed so that the answer of Step S100 is NO, this routine is once ended without performing the subsequent control. In case the preset time t2 has elapsed so that the answer of Step S100 is YES, on the contrary, this routine advances to Step S110. At this Step S110, the flag F is set at "3" and a command to reduce a control gain of the torque reducing amount of the engine is outputted. This control gain is a gain to determine the torque reducing amount of the engine corresponding to a slip speed, and the reduction amount of the engine torque is decreased by reducing this control gain.

Here, the preset time t2 is the time which is adjusted and set to reduce the fall of the output shaft torque resulting from an incompletion of the restoration of the actual engine torque from a torque-down, when the belt slip has converged. Therefore, the timing between the restoration of the actual clamping pressure and the restoration of the engine torque from the torque reducing state is adjusted by thus outputting the command to reduce the control gain of the torque reducing amount of the engine after the lapse of the preset time t2. Moreover, the actual torque reducing amount of the engine at the instant of the convergence of the belt slip is reduced, in other words, the belt slip converges and the lowered engine torque is restored to the initial level at the instant when the clamping pressure is restored, so that the depression of the output shaft torque, as might otherwise accompany the fall of the engine torque, i.e., the input torque of the continuously variable transmission 1, can be suppressed.

When the command to reduce the torque reducing amount of the engine is outputted at Step S110, it is decided (at Step S120) whether or not the belt slip has converged. The decision of the convergence of the belt slip can be made according to whether or not the deviation between the estimated gear ratio γ' and the actual gear ratio γ has reached or become smaller than the preset value set as a criterion.

In case the belt slip does not converge so that the answer of Step S120 is NO, this routine is once ended without performing the subsequent control. In case the belt slip converges so that the answer of Step S120 is YES, on the contrary, this routine advances to Step S130. At this Step S130, the flag F is set at "4", and a slip convergence time t6 is determined. This slip convergence time t5 is a period from the instant at which the belt slip resulting from the start of reduction of the actual engine torque is reduced, until the instant at which the convergence of the belt slip is decided. In addition, the slip convergence time t5 is calculated on the basis of the stored value such as the gear ratio γ, the gear changing rate Δγ and so on.

When the slip convergence time t5 is calculated at Step S130, it is decided (at Step S140) whether or not the preset time t3 has elapsed from the instant at which the command to reduce the engine torque is outputted. This preset time t3 is the preset time sufficient to complete the restoration of the reduced actual engine torque and the reduced actual clamping pressure after the belt slip converged.

In case the preset time t3 has not elapsed so that the answer of Step S140 is NO, this routine is once ended without performing the subsequent controls. In case the preset time t3 has elapsed so that the answer of Step S140 is YES, on the contrary, this routine advances to Step S150. At this Step S150, the map value, the torque reducing amount of the engine and the clamping pressure restoration command time t1, are learned and corrected to set the new clamping pressure.

Specifically, first of all, the map value to lower and set the clamping pressure is corrected to the level which is the sum of the actual clamping pressure at the belt slip decision time and the clamping pressure corresponding to the road surface input. Namely, the clamping pressure set on the basis of this map value is set to the level as low as possible within the range of no slip. Also, the torque reducing amount of the engine is corrected on the basis of the slip convergence time t5 determined at the aforementioned Step S130. As a result of this, the actual torque reducing amount of the engine at the convergence time of the belt slip is reduced, and therefore, the torque reducing amount of the engine is set so as to suppress the drop of the output shaft torque. At the same time, the clamping pressure restoration command time t1 is corrected on the basis of the slip convergence time t5. In other words, the clamping pressure restoration command time t1 is adjusted and set so as to start the restoration of the lowered actual clamping pressure after the belt slip converged. After that, moreover, the flag F and the stored value are cleared (at Step S160) and this routine is ended.

Here will be described the aforementioned example with reference to the time chart in FIG. 2. First of all, a clamping pressure lowering command to detect the belt slip is outputted at point A. Then, the actual clamping pressure starts lowering after the lapse of a dead period td1 between the points A and A' which is an unavoidable control delay. When the actual clamping pressure is lowered, the belt slip is caused eventually at point B, and as mentioned above, the slip is decided at point C on the basis of the compared value between the estimated gear changing rate Δγ' and the actual gear changing rate Δγ.

When the belt slip is decided at point C, the command to reduce the engine torque is outputted in an amount set at the aforementioned Step S70 at the same time. Then, the reduction of the actual engine torque is started with the unavoidable control delay in response to the command to reduce the engine torque. And, a command to restore the clamping pressure lowered at point D is outputted. Specifically, the period as indicated from point C to point D is the clamping pressure restoration command time t1, as the period from the instant when the belt slip is decided, until a clamping pressure raising command to restore the lowered clamping pressure is outputted. The actual clamping pressure fluctuates with the unavoidable control delay in response to the command value, and after that, the restoration of the actual clamping pressure lowered at point I is started.

The belt slip starts converging at or around point E and converges at point H by the effect of the reduction of the actual engine torque. Specifically, the period as indicated from point H to point I is an actual clamping pressure restoration starting time t4, in which the lowered actual clamping pressure starts restoring from the convergence of the belt slip, and the period as indicated from point E to point H is the slip convergence time t5. Meanwhile, a command to reduce the control gain of the torque reducing amount of the engine is outputted at point F or the instant at which the preset time t2 has elapsed from point C at which the belt slip is decided, and a command to end the reduction of the engine torque is outputted at point G. On this occasion, the actual engine torque fluctuates in response to the command value with the unavoidable control delay, and the reduction of the actual engine torque is ended to complete the restoration at or after point J or point I where the restoration of the actual clamping pressure is started.

Specifically, the torque reducing amount of the engine is adjusted and set in accordance with the length of the slip convergence time t5. As a result, the actual torque reducing amount of the engine is set to be reduced at the instant at which the belt slip converges, so that the fall of the output shaft torque can be suppressed. Also, the clamping pressure restoration command time t1 is adjusted and set in accordance with the length of the actual clamping pressure restoration starting time t4. Therefore, the clamping pressure raising command to restore the actual clamping pressure is outputted so as to start the restoration of the lowered actual clamping pressure after the convergence of the belt slip. As a result, it is possible to suppress such a fluctuation of the output shaft torque that the continuously variable transmission 1 is brought into the abrupt upshift state caused by the start of raise in the actual clamping pressure before the convergence of the belt slip.

Moreover, the map value, the torque reducing amount of the engine and the clamping pressure restoration command time t1 for setting the clamping pressure are corrected at point K or the instant at which the preset time t3 set as a sufficient time to complete the restoration of the reduced actual engine torque and the lowered actual clamping pressure has elapsed from point C at which the belt slip is decided. Then, the routine mentioned above is once ended and a new routine is started.

Here will be described an another example of aforementioned engine torque reducing control with reference to the time chart in FIG. 3. First of all, the torque reducing amount of the engine is set on the basis of the action state of e.g., the engine speed, the engine torque, the temperature of cooling water for the engine 5, the gear ratio γ of the continuously variable transmission 1, the temperature of working oil for the hydraulic line and so on after the belt slip is decided at point C shown in (a) of FIG. 3. This torque reduction is maintained during the preset time t6. After that, the torque reducing amount of the engine torque command value is reduced stepwise at point F, and an ending command of the reduction of the engine is outputted at point G where the belt slip extent determined on the basis of the deviation between the estimated gear ratio γ' and the actual gear ratio γ has reached or become smaller than the preset extent.

Besides, (b) in FIG. 3 shows an example of the case in which the torque reducing amount of the engine is reduced gradually with a preset gradient, in stead of being reduced stepwise as mentioned above. Thus, the fluctuation of the output shaft torque at the belt slip convergence time can be smaller by reducing the torque reducing amount of the engine stepwise or gradually with the preset gradient, when the reduction of the engine torque is carried out and the actual engine torque is restored.

As has been described, according to the cooperative control system of the present invention which is constructed to carry out the controls shown in FIG. 1 to FIG. 3, when the slip is detected in the continuously variable transmission 1, a rising start timing of the actual clamping pressure and a restore completion timing of the reduced actual engine torque are adjusted properly, so as to start rising of the actual clamping pressure after the instant of the slip convergence, and to complete the restoration of the actual engine torque lowered afterward. Moreover, the torque reducing amount is reduced gradually and the restoration is completed as the engine torque reduction is restored. Therefore, the fluctuation of the output shaft torque and shocks can be suppressed when the restoration of lowered actual engine torque is completed. And as a result, an uncomfortable feeling or the like due to the fluctuation of the output shaft torque can be prevented or suppressed.

Moreover, the torque reducing amount of the engine is adjusted and properly set in accordance with the slip convergence time from the instant at which the belt slip starts reducing until the instant at which the belt slip converges, and the rising start timing of the actual clamping pressure is adjusted and properly set in accordance with the action state of the drive line such as the engine speed or the like. As a result, the uncomfortable feeling or the like due to the fluctuation of the output shaft torque can be prevented or suppressed.

Here will be briefly described the relation between aforementioned examples and the present invention. The means for executing the controls of Steps S60, S90 and S110 (i.e., an electronic control unit for transmission (GVT-ECU) 25, an electronic control unit for engine (E/G-ECU) 26) shown in FIG. 1 corresponds to the clamping pressure/input torque sequential controlling device or the clamping pressure/input torque sequential control means of the invention, and the means for executing the controls of Step S60 and S90 (i.e., the electronic control unit for transmission (CVT-ECU) 25, an electronic control unit for engine (E/G-ECU) 26) shown in FIG. 1 corresponds to the clamping pressure raising commanding device or the clamping pressure raising command means of the invention. Also, the means for executing the control of Step S150, (i.e., the electronic control unit for transmission (CVT-ECU) 25, an electronic control unit for engine (E/G-ECU) 26) shown in FIG. 1 corresponds to the clamping pressure/input torque learning device or the clamping pressure/input torque learning means of the invention.

Here, this invention should not be limited to the specific examples thus far described. For example, the slip decided at Step S40 shown in FIG. 1 may be a slip caused by the change in the torque acting on the continuously variable transmission 1 when the vehicle is running, or otherwise, may be a slip caused by lowering the clamping pressure. Moreover, the continuously variable transmission to which the invention is applied may be a traction type (i.e., a toroidal type) continuously variable transmission other than the belt type continuously variable transmission. Furthermore, the present invention includes a control method to be carried out in the control unit mentioned above.

Here will be synthetically described the advantages to be achieved by this invention. According to the control system of the invention, the raising command timing of the clamping pressure and the raising command timing of the lowered input torque are adjusted properly so as to start raising the actual clamping pressure at or after the instant of the slip convergence in the continuously variable transmission, and to complete the restoration of the lowered actual input torque afterward. As a result, a resumption of the slip in the continuously variable transmission and the uncomfortable feeling due to widening of the fluctuation of the output shaft torque can be prevented or suppressed.

Moreover, according to the control system of the invention, the raising command timing of the clamping pressure is adjusted properly on the basis of, e.g., the action state of the prime mover such as the revolution speed at that instant. Specifically, the raising command timing of the clamping pressure is set to start raising the actual clamping pressure at or after the instant of the slip convergence in the continuously variable transmission, and to complete the restoration of the lowered actual input torque afterward. As a result, the resumption of the slip in the continuously variable transmission and the uncomfortable feeling due to the fluctuation of the output shaft torque can be prevented or suppressed.

Furthermore, according to the control system of the invention, the amount of the input torque lowering command is controlled to be reduced gradually so as to complete the restoration, in case the slip converges in the continuously variable transmission, and the lowered actual input torque is to be restored. As a result, the uncomfortable feeling or the like due to the fluctuation of the output shaft torque can be prevented or suppressed, by suppressing the shocks at the time when the lowered actual input torque completes the restoration.

Still moreover, according to the control system of the invention, the raising command timing of the clamping pressure and the lowering command timing of the input torque are learned and corrected on the basis of the comparison result between the convergence timing of the slip and the start timing of the rise in the actual clamping pressure. Specifically, the raising command timing of the clamping pressure and the lowering command timing of the input torque are set so as to start raising the actual clamping pressure at or after the instant of the slip convergence in the continuously variable transmission, and to complete the restoration of the lowered actual input torque afterward. As a result, the resumption of the slip in the continuously variable transmission and the uncomfortable feeling due to the fluctuation of the output shaft torque can be prevented or suppressed.

Additionally, according to the control system of the invention, the amount of the input torque lowering command is properly set on the basis of the convergence time from the instant at which the slip starts reducing in the continuously variable transmission, or on the basis of the convergence gradient during that period. Specifically, amount of the input torque lowering command is set to start raising the actual clamping pressure after the instant of the slip convergence in the continuously variable transmission, and to complete the restoration of the lowered actual input torque afterward. As a result, the resumption of the slip in the continuously variable transmission and the uncomfortable feeling due to the fluctuation of the output shaft torque can be prevented or suppressed.

INDUSTRIAL APPLICABILITY

This invention can be utilized in not only an automobile but also various vehicles, and especially in a vehicle having a continuously variable transmission.

The invention claimed is:

1. A cooperative control system for a prime mover and a continuously variable transmission of a vehicle, in which the continuously variable transmission is connected to an output side of the prime mover for generating a driving force for running, and in which a clamping pressure to set a torque capacity of the continuously variable transmission is raised and an input torque to said continuously variable transmission is lowered on the basis of a decision of the slip in the continuously variable transmission, comprising:
clamping pressure/input torque sequential control means for raising an actual pressure of said clamping pressure at or after a deciding instant of said slip convergence, and for executing a control to complete a restoration of an actual torque of said lowered input torque afterward.

2. The cooperative control system for a prime mover and a continuously variable transmission according to claim 1, further comprising:
clamping pressure raising command means for setting a raising command timing of said clamping pressure on the basis of an action state of said prime mover or said continuously variable transmission.

3. The cooperative control system for a prime mover and a continuously variable transmission according to claim 1, further comprising:
input torque gradually increasing means for completing the restoration of the actual torque of lowered said input torque by raising gradually.

4. The cooperative control system for a prime mover and a continuously variable transmission according to claim 1, further comprising:
input torque gradually increasing means for completing the restoration of the actual torque of lowered said input torque by raising gradually.

5. The cooperative control system for a prime mover and a continuously variable transmission according to claim 1, further comprising:
clamping pressure/input torque learning means for learning and correcting the raising command timing of said clamping pressure with respect to a lowering command timing of said input torque, on the basis of a convergence timing of said slip and a start timing of a rise in the actual damping pressure.

6. The cooperative control system for a prime mover and a continuously variable transmission according to claim 1, further comprising:
input torque lowering command means for setting an amount of said input torque lowering command on the basis of a convergence period from
the start of the reduction of said slip until the convergence of said slip, or on the basis of a convergence gradient.

7. The cooperative control system for a prime mover and a continuously variable transmission according to claim 1, wherein:
said clamping pressure/input torque sequential control means includes a control means for setting a clamping pressure restoration command time, from a preset time until an instant at which a clamping pressure raising command to restore the clamping pressure lowered to detect said slip is outputted.

8. The cooperative control system for a prime mover and a continuously variable transmission according to claim 7, wherein:
said clamping pressure/input torque sequential control means includes a control means for setting said clamping pressure restoration command time to start rising of the actual pressure of said clamping pressure at or after the instant of the slip convergence.

9. The cooperative control system for a prime mover and a continuously variable transmission according to claim 7, wherein:
said clamping pressure/input torque sequential control means includes a control means for outputting a clamping pressure raising command to restore said lowered clamping pressure at the instant at which said clamping pressure restoration command time has elapsed.

10. The cooperative control system for a prime mover and a continuously variable transmission according to claim 8, wherein:
said clamping pressure/input torque sequential control means includes a control means for outputting a clamping pressure raising command to restore said lowered clamping pressure at the instant at which said clamping pressure restoration command time has elapsed.

11. The cooperative control system for a prime mover and a continuously variable transmission according to claim 7, wherein:
said clamping pressure/input torque sequential control means includes a control means for reducing an amount of lowering command of said lowered input torque stepwise at a preset instant after said clamping pressure restoration command time has elapsed from said preset instant.

12. The cooperative control system for a prime mover and a continuously variable transmission according to claim 7, further comprising:
convergence time detecting means for detecting the convergence time from the instant at which a reduction of said slip is started until the convergence instant; and
correction means for changing at least any of said clamping pressure restoration command time, and a reducing amount of the input torque to reduce said slip, on the basis of the convergence time.

13. A cooperative control system for a prime mover and a continuously variable transmission of a vehicle, in which the continuously variable transmission is connected to an output side of the prime mover for generating a driving force for running, and in which a clamping pressure to set a torque capacity of the continuously variable transmission is raised and an input torque to said continuously variable transmission is lowered on the basis of a decision of the slip in the continuously variable transmission, comprising:
a clamping pressure/input torque sequential controller for raising an actual pressure of said clamping pressure at or after a deciding instant of said slip convergence, and for executing a control to complete a restoration of an actual torque of said lowered input torque afterward.

14. The cooperative control system for a prime mover and a continuously variable transmission according to claim 13, further comprising:
a clamping pressure raising command device for setting a raising command timing of said clamping pressure on the basis of an action state of said prime mover or said continuously variable transmission.

15. The cooperative control system for a prime mover and a continuously variable transmission according to claim 13, further comprising:

an input torque gradually increasing device for completing the restoration of the actual torque of lowered said input torque by raising gradually.

16. The cooperative control system for a prime mover and a continuously variable transmission according to claim 14, further comprising:

an input torque gradually increasing device for completing the restoration of the actual torque of lowered said input torque by raising gradually.

17. The cooperative control system for a prime mover and a continuously variable transmission according to claim 13, further comprising:

a clamping pressure/input torque learning device for learning and correcting the raising command timing of said clamping pressure with respect to a lowering command timing of said input torque, on the basis of a convergence timing of said slip and a start timing of a rise in the actual clamping pressure.

18. The cooperative control system for a prime mover and a continuously variable transmission according to claim 13, further comprising:

an input torque lowering command device for setting an amount of said input torque lowering command on the basis of a convergence period from the start of the reduction of said slip until the convergence of said slip, or on the basis of a convergence gradient.

19. A cooperative control method for a prime mover and a continuously variable transmission of a vehicle, in which the continuously variable transmission is connected to an output side of the prime mover for generating a driving force for running, and in which a clamping pressure to set a torque capacity of the continuously variable transmission is raised and an input torque to said continuously variable transmission is lowered on the basis of a decision of the slip in the continuously variable transmission, comprising:

carrying out a control to raise an actual pressure of said clamping pressure at or after a deciding instant of said slip convergence; and carrying out a control to complete a restoration of an actual torque of said lowered input torque afterward.

* * * * *